United States Patent
Barton

[11] Patent Number: 6,164,533
[45] Date of Patent: Dec. 26, 2000

[54] POINT OF SALE AUTOMATIC SAVINGS PROGRAM CONTRIBUTION SYSTEM

[76] Inventor: Blain Barton, 15232 SE. 39th St., Bellevue, Wash. 98006-1704

[21] Appl. No.: 09/190,567

[22] Filed: Nov. 12, 1998

[51] Int. Cl.[7] .................................................. G06K 5/00
[52] U.S. Cl. .................... 235/380; 235/379; 235/462.43; 705/35
[58] Field of Search .................................. 235/380, 379, 235/462.43; 705/35, 36, 39

[56] References Cited

U.S. PATENT DOCUMENTS

| | | |
|---|---|---|
| 4,346,442 | 8/1982 | Musmanno . |
| 4,694,397 | 9/1987 | Grant et al. . |
| 4,742,457 | 5/1988 | Leon et al. . |
| 4,750,119 | 6/1988 | Cohen et al. . |
| 4,839,504 | 6/1989 | Nakano . |
| 5,042,619 | 8/1991 | Kohno ........................................ 186/61 |
| 5,056,019 | 10/1991 | Schultz et al. . |
| 5,192,854 | 3/1993 | Counts . |
| 5,214,579 | 5/1993 | Wolfberg et al. ........................ 364/408 |
| 5,287,268 | 2/1994 | McCarthy ................................ 364/405 |
| 5,297,026 | 3/1994 | Hoffman . |
| 5,302,811 | 4/1994 | Fukatsu .................................... 235/381 |
| 5,483,444 | 1/1996 | Heintzeman et al. . |
| 5,689,100 | 11/1997 | Carrithers et al. . |
| 5,689,649 | 11/1997 | Altman et al. . |
| 5,745,706 | 4/1998 | Wolfberg et al. ........................ 395/235 |
| 5,787,404 | 7/1998 | Fernandez-Holmann ................. 705/35 |
| 5,991,736 | 11/1999 | Ferguson et al. ......................... 705/14 |

FOREIGN PATENT DOCUMENTS

| | | |
|---|---|---|
| WO 82/00213 | 1/1982 | WIPO . |
| WO 92/15968 | 9/1992 | WIPO . |
| WO 95/26014 | 9/1995 | WIPO . |
| WO 96/41462 | 12/1996 | WIPO . |

*Primary Examiner*—Michael G Lee

[57] ABSTRACT

A system is provided for automatically contributing monies to a savings program upon making a purchase. Included is an input device for generating an identification signal for identifying an account holder and a monetary signal monetary amount. Also provided is a service provider connected to the input device for receiving the identification signal and the monetary signal for calculating signal representative of a savings program contribution based on the monetary amount. A saving program provider is connected to the service provider for receiving the signal representative of the savings program contribution amount and further contribute the savings program contribution to an investment of the holder of the corresponding card.

17 Claims, 4 Drawing Sheets

POINT OF SALE AUTOMATIC SAVINGS PROGRAM CONTRIBUTION SYSTEM

BACKGROUND OF THE INVENTION

1. Field of the Invention

The present invention relates to integrated financial network systems and more particularly pertains to a new point of sale automatic savings program contribution system for automatically contributing monies to a savings program upon making a purchase with a debit/credit/calling card.

2. Description of the Prior Art

The use of integrated financial network systems is known in the prior art. More specifically, integrated financial network systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art include U.S. Pat. No. 5,689,100; U.S. Pat. No. 5,287,268; U.S. Pat. No. 4,742,457; U.S. Pat. No. 5,689,649; U.S. Pat. No. 5,483,444; U.S. Pat. No. 5,192,854; and U.S. Pat. No. 4,839,504; U.S. Pat. No. 5,056,019; U.S. Pat. No. 4,346,442; U.S. Pat. No. 5,297,026; U.S. Pat. No. 4,750,119; U.S. Pat. No. 4,694,397.

In these respects, the point of sale automatic savings program contribution system according to the present invention substantially departs from the conventional concepts and designs of the prior art, and in so doing provides an apparatus primarily developed for the purpose of automatically contributing monies to a savings program upon making a purchase with a debit/credit/calling card.

SUMMARY OF THE INVENTION

In view of the foregoing disadvantages inherent in the known types of integrated financial network systems now present in the prior art, the present invention provides a new point of sale automatic savings program contribution system construction wherein the same can be utilized for automatically contributing monies to a savings program upon making a purchase with a debit/credit/calling card.

The general purpose of the present invention, which will be described subsequently in greater detail, is to provide a new point of sale automatic savings program contribution system apparatus and method which has many of the advantages of the integrated financial network systems mentioned heretofore and many novel features that result in a new point of sale automatic savings program contribution system which is not anticipated, rendered obvious, suggested, or even implied by any of the prior art integrated financial network systems, either alone or in any combination thereof.

To attain this, the present invention generally comprises a scanner positioned at a point of sale for scanning universal product codes positioned on entities for sale. From Such scanning, a sale amount of the entities for sale is identified. Also included is a point of sale register connected to the scanner for subtotaling the sale amounts of the entities for sale and calculating a sales tax associated with the sale amounts of the entities for sale. The sale amounts of the entities for sale and the sales tax are then totaled. As an option, the register may be further adapted for totaling a plurality of coupon amounts. To this end, the sale register is adapted to generate a total sale amount and a total coupon amount. A card reader is provided with a display and a keypad. It should be noted that the card reader is positioned at the point of sale and is further connected to the point of sale register for reading a debit/credit card and ascertaining an identification of a holder of the debit/credit card. Further, the card reader is adapted to receive the total sale amount and the total coupon amount from the point of sale register. As an option a coin collector is connected to a card reader for ascertaining an identification of a holder of the debit/credit card. In use, the coin collector serves to count and sort a plurality of coins, thereby generating a total change amount. Yet another option includes a phone service provider for directing calls on a telecommunication network. In operation, the phone service provider is adapted for receiving information on a calling card and receiving a payment via an account associated with the calling card. The phone service provider is further adapted to ascertain an identification of a holder of the calling card and calculate a savings in cost of phone calls placed with the calling card. As such, a total savings amount is generated that is representative of a saving program contribution. Connected to the card reader and the coin collector is a debit/credit provider for receiving the total sale amount, the total coupon amount, the total change amount and the identification of the holder of the debit/credit card. In use, the debit/credit provider is further adapted to work in one of a plurality of modes dependent on the desires of the holder of the card. In a first mode, the debit/credit provider calculates a percentage of the total sale amount representative of the savings program contribution. In a second mode, the debit/credit provider calculates a difference between the total sale amount and a rounded up dollar value which is in turn representative of the savings program contribution. In a third mode, the debit/credit provider uses the total coupon amount to be representative of the savings program contribution. Finally, the debit/credit provider uses the total change amount to be representative of the savings program contribution in a fourth mode. Connected to the phone service provider and the debit/credit provider is a saving program provider for receiving the savings program contribution amount and the identification of the holder of the corresponding card. Upon such receipt, the phone service provider further contributes the savings program contribution to an investment of the holder of the corresponding card.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new point of sale automatic savings program contribution system apparatus and method which has many of the advantages of the integrated financial network systems mentioned heretofore and many novel features that result in a new point of sale automatic savings program contribution system which is not anticipated, rendered obvious, suggested, or even implied by any of the prior art integrated financial network systems, either alone or in any combination thereof.

It is another object of the present invention to provide a new point of sale automatic savings program contribution system which may be easily and efficiently manufactured and marketed.

It is a further object of the present invention to provide a new point of sale automatic savings program contribution system which is of a durable and reliable construction.

An even further object of the present invention is to provide a new point of sale automatic savings program contribution system which is susceptible of a low cost of manufacture with regard to both materials and labor, and which accordingly is then susceptible of low prices of sale to the consuming public, thereby making such point of sale automatic savings program contribution system economically available to the buying public.

Still yet another object of the present invention is to provide a new point of sale automatic savings program contribution system which provides in the apparatuses and methods of the prior art some of the advantages thereof, while simultaneously overcoming some of the disadvantages normally associated therewith.

Still another object of the present invention is to provide a new point of sale automatic savings program contribution system for automatically contributing monies to a savings program upon making a purchase with a debit/credit/calling card.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
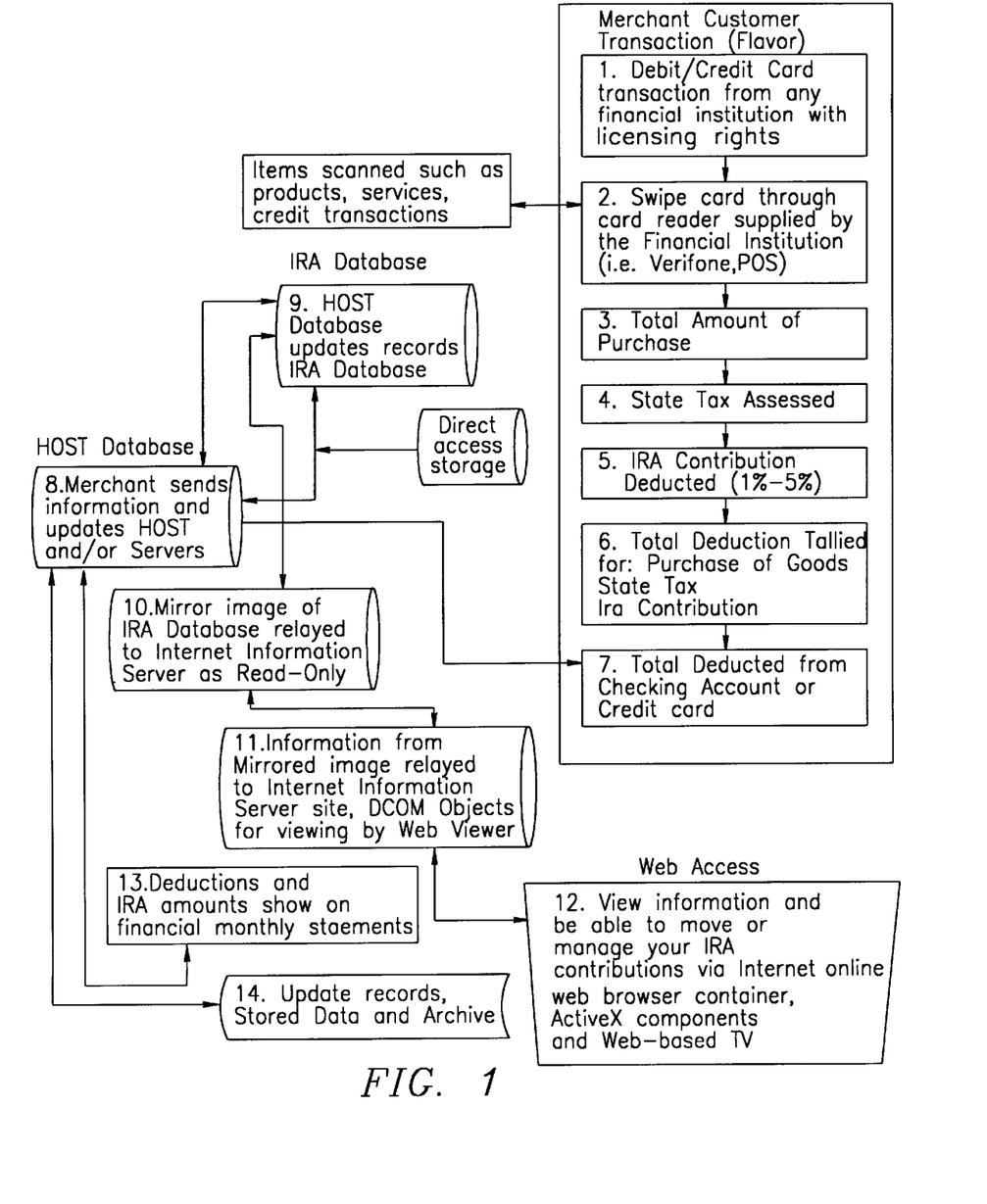
FIG. 1 is a flow chart of the present invention operating in the first mode of operation.
Figure 2:
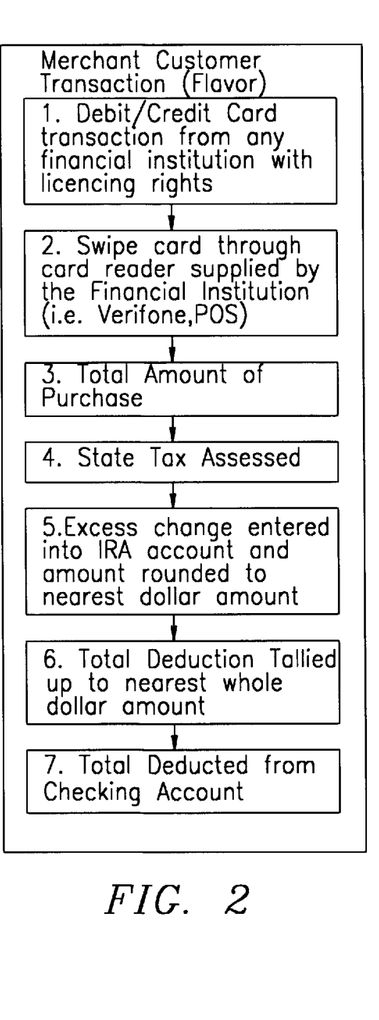
FIG. 2 is a portion of the flow chart depicting the operation of the present invention unique to the second mode of operation replacing steps 1 through 7 of FIG. 1.
Figure 3:
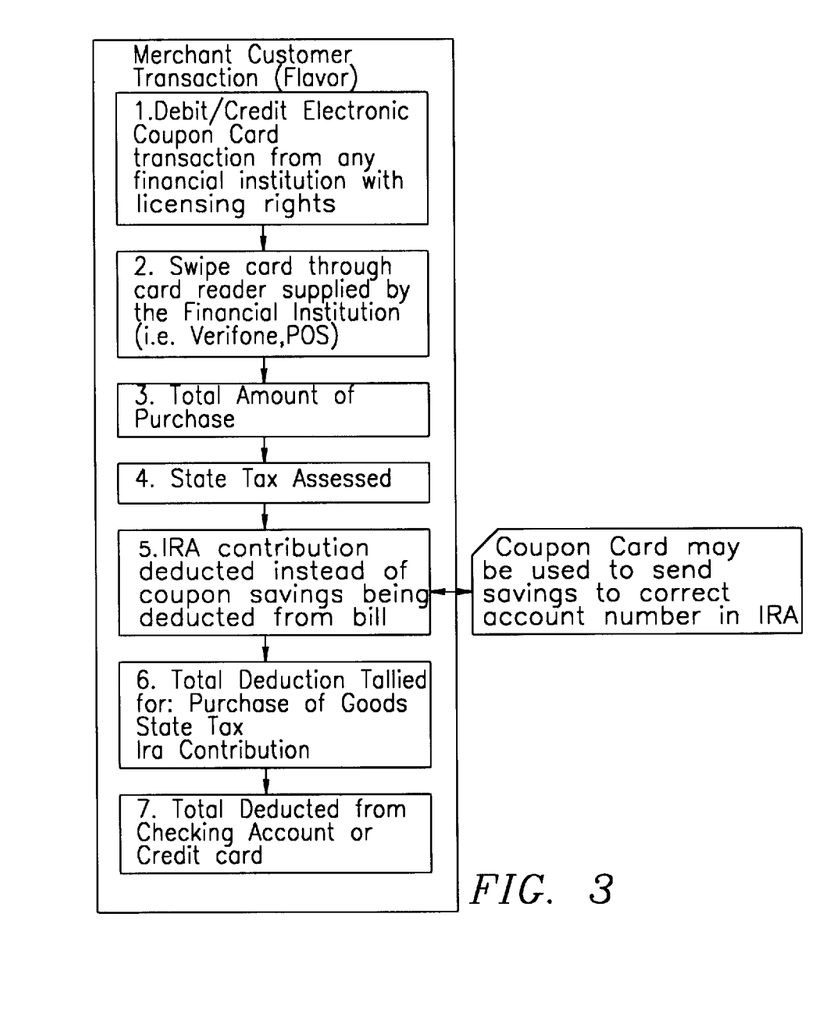
FIG. 3 is a portion of the flow chart depicting the operation of the present invention unique to the third mode of operation replacing steps 1 through 7 of FIG. 1.
Figure 4:
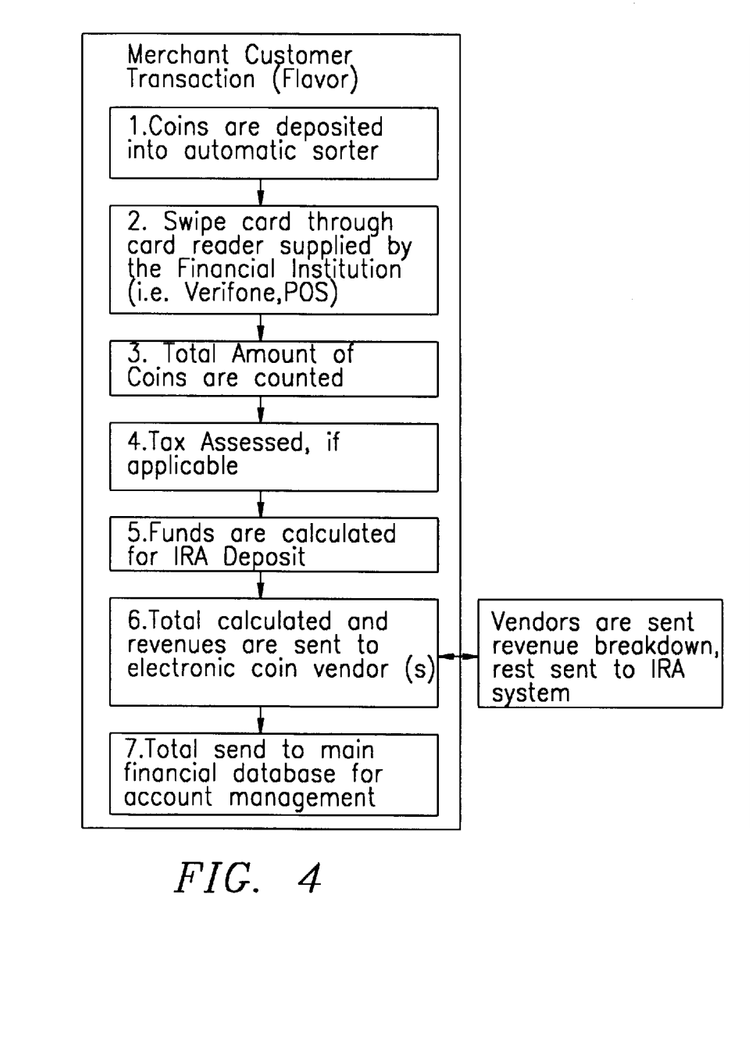
FIG. 4 is a portion of the flow chart depicting the operation of the present invention unique to the fourth mode of operation replacing steps 1 through 7 of FIG. 1.
Figure 5:
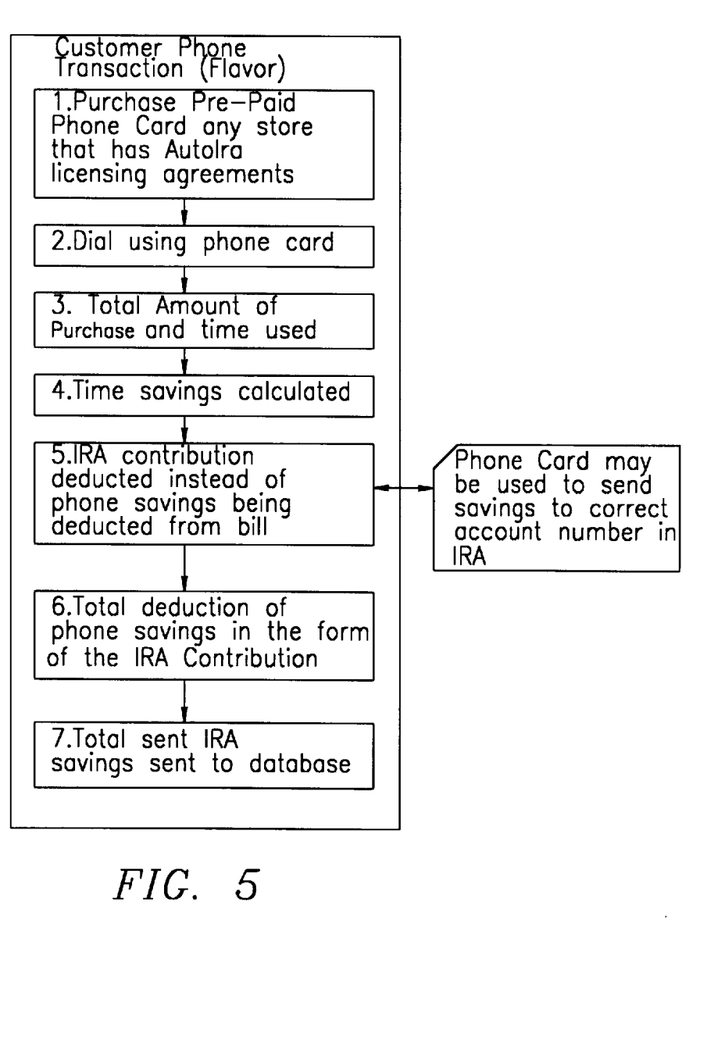
FIG. 5 is a portion of the flow chart of the present invention operating in conjunction with a telephone service provider replacing steps 1 through 7 of FIG. 1.
Figure 6:
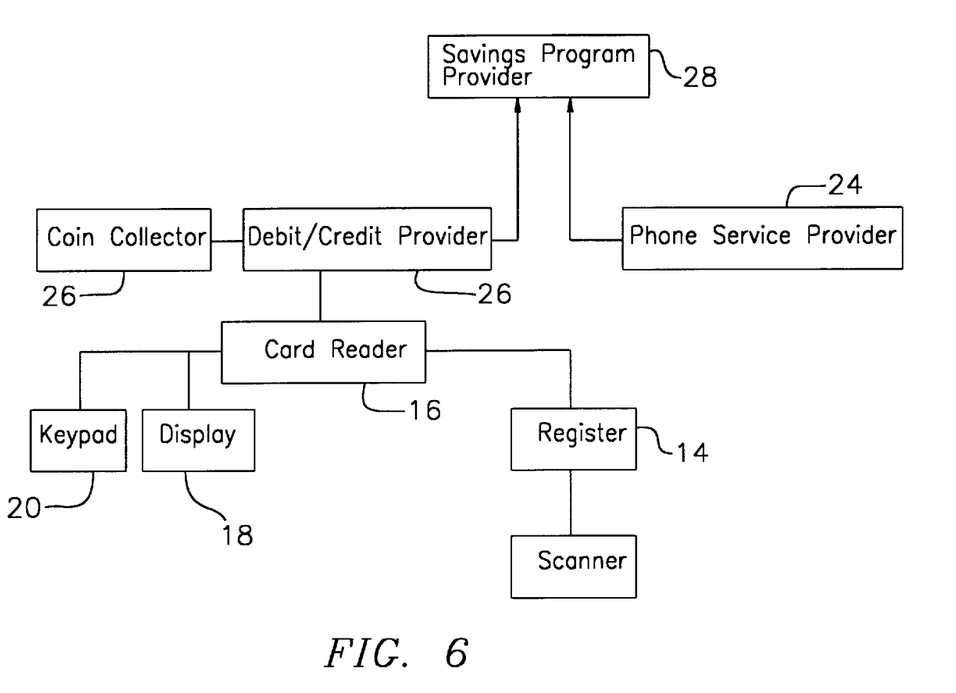
FIG. 6 is a complete schematic diagram of the present invention.

With reference now to the drawings, and in particular to FIGS. 1 through 6 thereof, a new point of sale automatic savings program contribution system embodying the principles and concepts of the present invention and generally designated by the reference numeral 10 will be described.

The present invention, designated as numeral 10, includes a system for automatically contributing monies to a savings program upon making a purchase with a debit/credit/calling card or collecting and contributing coins.

The present invention preferably includes a scanner 12 positioned at a point of sale for scanning universal product codes positioned on entities for sale. From such scanning, a sale amount of the entities for sale is identified.

Also included is a point of sale register 14 connected to the scanner for subtotaling the sale amounts of the entities for sale and calculating a sales tax associated with the sale amounts of the entities for sale. The sale amounts of the entities for sale and the sales tax are then totaled. As an option, the register may be further adapted for totaling a plurality of coupon amounts. To this end, the sale register is adapted to generate a total sale amount and a total coupon amount. It should be noted that the register may exclude the scanner when used to ring up services and the like. Further, the register may be reduced to a form of a simple computer.

A card reader 16 is provided with a display 18 and a keypad 20. It should be noted that the card reader is positioned at the point of sale and is further connected to the point of sale register for reading a debit/credit card and ascertaining an identification of a holder of the debit/credit card. Further, the card reader is adapted to receive the total sale amount and the total coupon amount from the point of sale register. Its should be understood that the card reader may be used in carrying out various other tasks commonly associated with card readers, namely authorizing charges and the like.

As an option a coin collector 22 is connected to a card reader for ascertaining an identification of a holder of the debit/credit card. In use, the coin collector serves to count and sort a plurality of coins, thereby generating a total change amount.

Yet another option includes a phone service provider 24 for directing calls on a telecommunication network. In operation, the phone service provider is adapted for receiving information on a calling card and receiving a payment via an account associated with the calling card. The phone service provider is further adapted to ascertain an identification of a holder of the calling card and calculate a savings in cost of phone calls placed with the calling card. As such, a total savings amount is generated that is representative of a saving program contribution. Note FIG. 5.

Connected to the card reader and the coin collector is a debit/credit provider 26 for receiving the total sale amount, the total coupon amount, the total change amount and the identification of the holder of the debit/credit card.

In use, the debit/credit provider is further adapted to work in one of a plurality of modes dependent on the desires of the holder of the card. Note FIGS. 1–4. In a first mode, the debit/credit provider calculates a percentage of the total sale amount representative of the savings program contribution. See FIG. 1. In a second mode, the debit/credit provider calculates a difference between the total sale amount and a rounded up dollar value which is in turn representative of the savings program contribution. See FIG. 2. In a third mode, the debit/credit provider uses the total coupon amount to be representative of the savings program contribution. See FIG. 3. Finally, the debit/credit provider uses the total change amount to be representative of the savings program contribution in a fourth mode. See FIG. 4.

To accomplish the foregoing functions, the debit/credit and telephone service providers each are equipped with computers that operate under the control of software to fulfill the objective of the present invention. In various alternate embodiments, other agencies or providers may be equipped with such means to accomplishing the desired end result.

Connected to the phone service provider and the debit/credit provider is a saving program provider 28 for receiving the savings program contribution amount and the identification of the holder of the corresponding card. Upon such receipt, the phone service provider further contributes the savings program contribution to an investment of the holder of the corresponding card. It should be noted that the aforementioned investment may take the form of an IRA, money market account or any other means of saving money. In use, the saving program provider is adapted to generate tabular summaries of the contributions to the aforementioned investment. In the preferred embodiment, the saving program provider is connected to a telecommunication network and allows restricted access to such summaries via the World Wide Web providing secure connections. It should be noted that the transfer of information by the various providers and remaining components set forth hereinabove are carried by electrical or other types of signals.

Examples of the various elements of the present invention is as follows:

Element #1—Debit/Credit Transaction into IRA Account, Money Market and Savings on every transaction or purchase of goods via a deduction of purchase amount, taxes, and IRA contribution which consist of 1%–5%, or any other amount, of every transaction into various savings accounts. This service may be called AutoIRA services.

Example: John Doe purchases $200 on a single purchase of household items, clothing, food and other services. John is then taxed on his purchases at a sales tax of 8.4% for $16.80. John then takes an IRA deduction\selection of 4% setup up via his AutoIRA EFT service for $8.67. The total amount is $225.47. John then deducts this amount from his check book. The following process below explains the process of the debit transaction.

1. John uses debit card or credit card for purchases of goods and services.
2. Card is swiped through $3^{rd}$ party verification box (POS—Point of Sale.) for purchase of goods.
3. Charges are tallied to include amount of purchase, local and government taxes, and AutoIRA contribution in the amount range from 1% to 5%, or any other amount, of the total purchase. The percentage of the IRA deduction is setup through the bank or financial institution as a service and maintained by the financial institution in conjunction with patent founder.
4. Data is wire-relayed to bank or financial institution's HOST computer and debit transaction to checking or credit card main accounts are executed.
5. The Electronic Funds Transfer (EFT) transaction is verified and the debit/deduction is made to the individual card holder's account for purchases made including IRA contributions.
6. The 1%–5% IRA contribution is then forwarded to the main IRA database kept by the bank or financial institution to be displayed to the customers account and or records. The IRA contributions are then sent to an individual investment account that is aligned with their current banking and savings accounts.
7. IRA data is then updated and uploaded to AutoIRA web network as a secured mirrored image coming from each banking, investment and/or financial institution.
8. Customers are able to adjust fund selections for their IRAs, non-real time however for protection, not the amounts themselves. The changes to the investment portfolios will not take place until the following business day and no funds are converted to new fund selection until authorized.
9. All mirrored IRA contributions images are sent and managed by the AutoIRA entity. All exercised funds are sent to cardholder without penalty, unless taken out before the allocated timeframe following the RothIRA and IRA rules set forth by the United States and Overseas Governments.
10. All IRA balances and statement information will reside at the bank or financial institution
11. The mirrored image is then displayed to an enterprise Windows NT network that displays the information via an Internet Information Server (Using Java, HTML, and ActiveX, Portals, Server Pages) and SQL or Oracle databases. Information can then be viewed by an Internet Browser that supports HTML. All account balances and portfolios can be managed by the customer on a daily basis.
12. Information is updated on main host or Domain Controllers and/or computers and all transactions are sent, logged, and archived to server and internet active server pages reflecting individual investment portfolios are updated. Statements are sent to each person every quarter.

Additional tools which may be used include an investment calculator, IRA software planner, IRA Account Manager, and selection list that is Internet based.

Element #2—Debit/Credit Transaction on purchases electronically transferred into college education fund. This service may be called EducateIRA services.

Example: Sue's parents are saving for her college education. When they make a purchase for $50.00 on groceries, they also pay state sales tax at 8.4% for $4.20. The total comes to $54.20. There is then a deduction for their daughters education at 5% of the purchase at $2.71 and an AutoIRA contribution of 3% for $1.62 for a grand total of $58.52. With the Roundup program the total figure would be $59.00. This amount is deducted from their checking account.

1. Customer uses debit card or credit card for purchases of goods and services.
2. Card is swiped through $3^{rd}$ party verification box (POS—Point of Sale.) for purchase of goods.

3. Charges are tallied to include amount of purchase, local and government taxes, and AutoIRA contribution in the amount range from 1% to 5% of the total purchase. The percentage of the Education deduction is setup through the bank or financial institution as a service and maintained by the financial institution.
4. Data is wire-relayed to bank or financial institution's HOST computer and debit transaction to checking or credit card main accounts are executed.
5. The Electronic Funds Transfer (EFT) transaction is verified and the debit/deduction is made to the individual card holder's account for purchases made including Education contributions.
6. The 1%–5% or any other IRA contribution is then forwarded to the main IRA database kept by the bank or financial institution to be displayed to the customers account and or records. The IRA contributions are then sent to an individual investment account that is aligned with their current banking and savings accounts.
7. IRA data is then updated and uploaded to AutoIRA web network as a mirrored image coming from each banking, investment and/or financial institution.
8. Customers are able to adjust fund selections for their IRAs, however for protection, not the amounts themselves. The changes to the investment portfolios will not take place until the following business day and no funds are converted to new fund selection.
9. All mirrored IRA contributions images are sent and managed by the AutoIRA entity. All exercised funds are sent to cardholder without penalty, unless taken out before the allocated timeframe following the RothIRA and IRA rules set forth by the United States and Overseas Governments.
10. All IRA balances and statement information will reside at the bank or financial institution
11. The mirrored image is then displayed to an enterprise Windows NT network that displays the information via an Internet Information Server (Using Java, HTML, and ActiveX, Portals, Server Pages) and SQL or Oracle databases. Information can then be viewed by an Internet Browser that supports HTML. All account balances and portfolios can be managed by the customer on a daily basis.
12. Information is updated on main host or Primary Domain Controller and/or computer and all transactions are sent, logged, and archived to server and internet active server pages reflecting individual investment portfolios are updated. Statements are sent to each person every quarter.

Element #3—Appoint person to be beneficiary for IRA account when IRA holder dies to avoid funds from going into a non-specified account. This service may be called SurvivialRA.

Element #4—Debit/Credit Transaction into IRA Account, Money Market and Savings on every transaction or purchase of goods via a deduction of purchase amount, taxes, and IRA contribution which consist of 1%–5% of every transaction via various accounts. The balances are then Rounded Up to the nearest whole dollar. This service may be called the Roundup Service.

Example: As with John Doe purchasing $200 worth of gas, clothing, food and other services. John is then taxed on his purchases at the Washington sales tax at 8.4% for $16.80. John then takes an IRA deduction of 4% setup up via his AutoIRA EFT service for $8.67. The total amount is $225.47. At this time, if John has the RoundUp service, the total purchase would be rounded up to $226.00. This makes checkbook entries a snap, and well worth the investment. John then deducts this amount from his checkbook. The following process below explains the process of the debit transaction.

1. Customer uses debit card or credit card for purchases of goods and services.
2. Card is swiped through $3^{rd}$ party verification box (POS—Point of Sale.) for purchase of goods.
3. Charges are tallied to include amount of purchase, local and government taxes, and AutoIRA contribution in the amount range from 1% to 5% of the total purchase. The percentage of the IRA deduction is setup through the bank or financial institution as a service and maintained by the financial institution.
4. Data is wire-relayed to bank or financial institution's HOST computer and debit transaction to checking or credit card main accounts are executed.
5. The Electronic Funds Transfer (EFT) transaction is verified and the debit/deduction is made to the individual card holder's account for purchases made including IRA contributions.
6. The 1%–5% IRA contribution is then forwarded to the main IRA database kept by the bank or financial institution to be displayed to the customers account and or records. The IRA contributions arc then sent to an individual investment account that is aligned with their current banking and savings accounts.
7. IRA data is then updated and uploaded to AutoIRA web network as a mirrored image coming from each banking, investment and/or financial institution.
8. Customers are able to adjust fund selections for their IRAs, however for protection, not the amounts themselves. The changes to the investment portfolios will not take place until the following business day and no funds arc converted to new fund selection.
9. All mirrored IRA contributions images are sent and managed by the AutoIRA entity. All exercised funds are sent to cardholder without penalty, unless taken out before the allocated timeframe. timeframe not following the RothIRA rules set forth by the United States and Overseas Governments.
10. All IRA balances and statement information will reside at the bank or financial institution
11. The mirrored image is then displayed to an enterprise Windows NT network that displays the information via an Internet Information Server (Using Java, HTML, and ActiveX Server Pages) and SOL database. Information can then be viewed by an Internet Browser that supports HTML. All account balances and portfolios can be managed by the customer on a daily basis.
12. Information is updated on main host or Primary Domain Controller and/or computer and all transactions are sent, logged, and archived to server and internet active server pages reflecting individual investment portfolios are updated. Statements are sent to each person every quarter.

Element #5—Debit purchases are sent into charity funds to be deducted from credit card, debit card transaction. Follow same processes for the charity contributions. This service may be called AutoCharity.

Element #6—Debit/Credit transactions from grocery coupons into IRA account. Follow same processes for getting information and funds to IRA account. This service may be called CouponIRA.

Element #7—Debit/Credit transaction from depositing coins into a machine and routing the change to IRA investment account. This service may be called PitchIRA.

Element #8—Refunds from Telephone company rebates send as "Real Savings" to IRA and investment, saving accounts. This service may be called CallingIRA. Follow same process for sending funds as mentioned above.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An article of manufacture:
   a computer usable code having a computer readable program code means embodied therein for automatically contributing funds from a deposit account of an individual to a savings program account of the individual based upon debit transactions made by the individual, the computer readable program code medium in said article of manufacture comprising:
   computer-readable program code for causing a computer to receive a signal representative of a payment amount from a third party, the payment amount corresponding to a debit transaction made by the individual from the third party,
   computer-readable program code for causing a computer to calculate a contribution amount to the savings program account from the deposit account, the contribution amount including a difference amount between the payment amount and a next higher whole dollar amount above the payment amount, and
   computer-readable program code for causing a computer to send a signal representative of the contribution amount to a saving program provider for initiating a transfer of funds from the deposit account to the savings program account equal to the contribution amount.

2. An article of manufacture as set forth in claim 1 wherein the computer-readable program code for causing a computer to calculate the contribution amount from the payment amount is further adapted to calculate a percent amount of the payment amount, and to include the percent amount in the contribution amount.

3. An article of manufacture as set forth in claim 1 wherein the contribution amount includes a total coupon amount.

4. An article of manufacture as set forth in claim 1 wherein the contribution amount includes a total change amount collected from a coin collector.

5. An article of manufacture as set forth in claim 1 wherein the contribution amount includes a telephone toll savings amount equal to savings in monetary cost of phone calls placed with a calling card.

6. A method of automatically contributing funds of an individual to a saving program of the individual based upon debit transactions made by the individual using a debit device of the individual, the method comprising:
   setting up a system for automatically contributing funds from a deposit account to a savings program account;
   accepting from a third party an order to withdraw a payment amount from said funds in said deposit account, said payment amount corresponding to a debit transaction made by the individual from said third party using said debit device; and
   calculating a contribution amount to be transferred from said deposit account to said savings program account, the contribution amount being based upon said payment amount.

7. The method of claim 6 additionally comprising withdrawing from said funds in said deposit account a sum amount equal to said payment amount and said contribution amount.

8. The method of claim 7 wherein said step of withdrawing comprises transferring said payment amount to said third party for payment of said debit transaction, and transferring said contribution amount to said savings program account.

9. The method of claim 6 wherein said step of setting up includes opening said deposit account for holding funds accessible using a debit device.

10. The method of claim 6 wherein said step of setting up includes establishing said savings program account for receiving funds.

11. The method of claim 10 wherein said savings program account comprises a retirement savings account.

12. The method of claim 6 wherein said step of setting up includes accepting deposit of funds into said deposit account.

13. The method of claim 6 wherein said step of setting up includes issuing a debit device for authorizing withdrawal of said funds from said deposit account.

14. The method of claim 13 wherein issuing said debit device comprises providing a debit card.

15. The method of claim 6 wherein calculating the contribution amount includes determining a difference amount between said payment amount and a next higher whole dollar amount above said payment amount, and setting said contribution amount equal to said difference amount.

16. The method of claim 6 wherein calculating the contribution amount includes determining a percent amount of said payment amount by multiplying said payment amount by a predetermined savings percentage, adding said percent amount and said payment amount to determine a total amount, rounding up said total amount to the next higher whole dollar amount above said total amount to determine a final amount, subtracting said payment amount from said final amount, and setting the difference equal to said contribution amount.

17. A method of automatically contributing funds of an individual to a savings program of the individual based upon debit transactions made by the individual using a debit device of the individual, the method comprising:
   setting up a system for automatically contributing funds from a deposit account to a savings program account, wherein said step of setting up includes:
   opening said deposit account for holding funds accessible using a debit device;
   establishing said savings program account for receiving funds, wherein said savings program account comprises a retirement savings account;

accepting deposit of funds into said deposit account;

issuing a debit device for authorizing withdrawal of said funds from said deposit account;

accepting from a third party an order to withdraw a payment amount from said funds in said deposit account, said payment amount corresponding to a debit transaction made by the individual from said third party using said debit device;

calculating a contribution amount to said savings program account based upon said payment amount, wherein calculating the contribution amount includes determining a difference amount between said payment amount and a next higher whole dollar amount above said payment amount, and setting said contribution amount equal to said difference amount;

withdrawing from said funds in said deposit account a sum amount equal to said payment amount and said contribution amount, said step of withdrawing comprising:

transferring said payment amount to said third party for payment of said debit transaction; and transferring said contribution amount to said savings program account.

* * * * *

(12) EX PARTE REEXAMINATION CERTIFICATE (9809th)
United States Patent
Barton (10) Number: US 6,164,533 C1
(45) Certificate Issued: Aug. 23, 2013

(54) POINT OF SALE AUTOMATIC SAVINGS PROGRAM CONTRIBUTION SYSTEM

(75) Inventor: Blain Barton, Bellevue, WA (US)

(73) Assignee: Barton Patent 533 LLC, Columbia, MO (US)

Reexamination Request:
No. 90/010,064, Dec. 5, 2007

Reexamination Certificate for:
Patent No.: 6,164,533
Issued: Dec. 26, 2000
Appl. No.: 09/190,567
Filed: Nov. 12, 1998

(51) Int. Cl.
*G06Q 20/00* (2012.01)
*G06Q 30/00* (2012.01)
*G07G 1/00* (2006.01)

(52) U.S. Cl.
USPC ......... 235/380; 235/379; 235/462.43; 705/35

(58) Field of Classification Search
None
See application file for complete search history.

(56) References Cited

To view the complete listing of prior art documents cited during the proceeding for Reexamination Control Number 90/010,064, please refer to the USPTO's public Patent Application Information Retrieval (PAIR) system under the Display References tab.

*Primary Examiner* — Anjan K. Deb (57) ABSTRACT

A system is provided for automatically contributing monies to a savings program upon making a purchase. Included is an input device for generating an identification signal for identifying an account holder and a monetary signal monetary amount. Also provided is a service provider connected to the input device for receiving the identification signal and the monetary signal for calculating signal representative of a savings program contribution based on the monetary amount. A saving program provider is connected to the service provider for receiving the signal representative of the savings program contribution amount and further contribute the savings program contribution to an investment of the holder of the corresponding card.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-17 are cancelled.

\* \* \* \* \*